May 16, 1939.   W. F. WATSON   2,158,597
FISHING REEL
Filed March 25, 1935
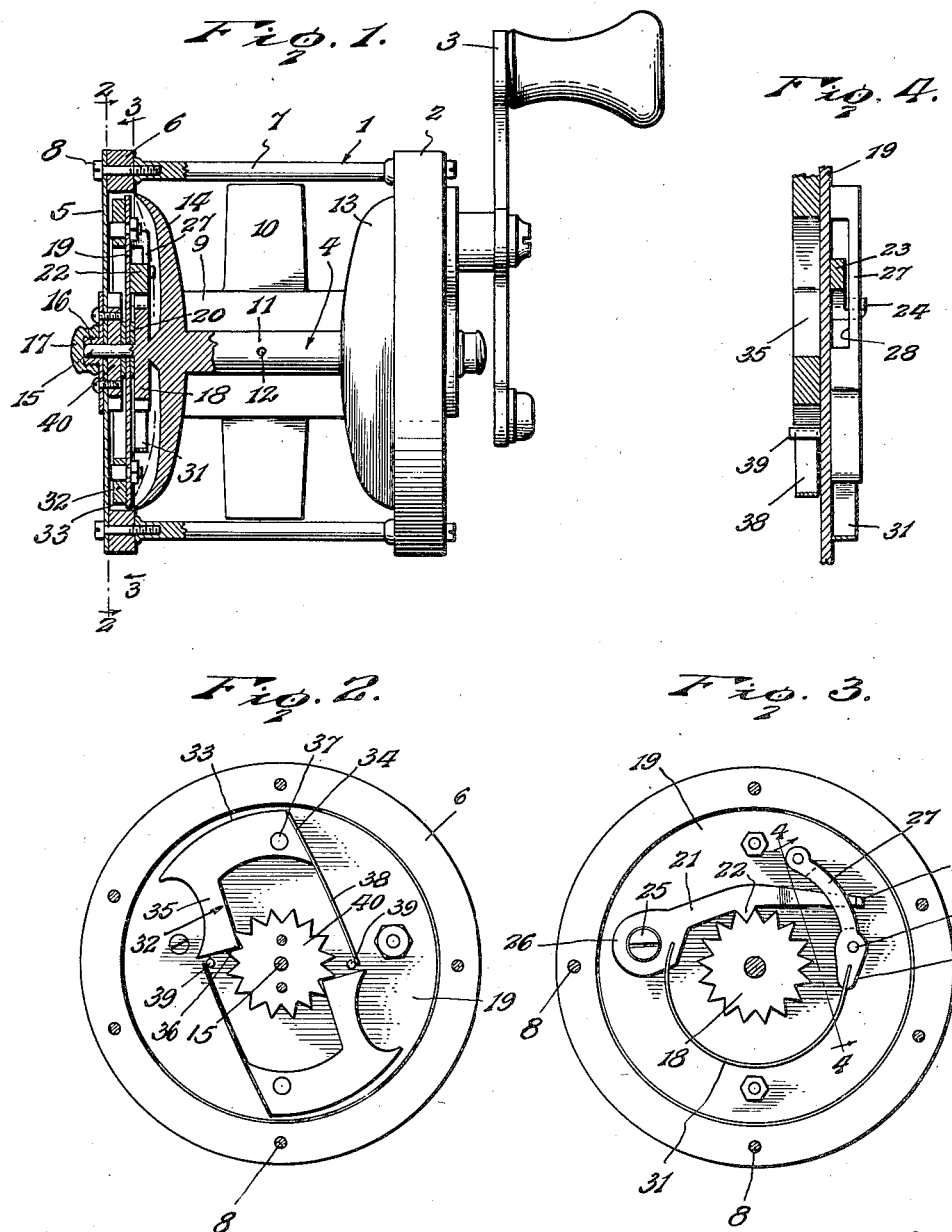
Inventor
W. F. Watson.

Patented May 16, 1939

2,158,597

UNITED STATES PATENT OFFICE 2,158,597

FISHING REEL

William F. Watson, Bradenton, Fla.

Application March 25, 1935, Serial No. 12,968

6 Claims. (Cl. 242—84.6)

This invention relates to an improved fishing reel and seeks, among other objects, to provide a device of this character wherein mechanism is employed for permitting the free casting of the reel without the attendant danger of possible snarling or tangling of the line.

Another object of the invention is to provide a fishing reel employing mechanism for retarding the speed of the spool during the casting operation so that fishermen, particularly those with little experience, will not be troubled with tangling of the line caused by overrunning of the spool.

A further object of the invention is to provide a fishing reel employing a double ratchet connection between the spool and the frame which will permit the reel to rotate and cause the usual clicking sound when the line is being wound or being paid out, but which will not interfere with the proper action of the line.

And a still further object of the invention is to provide a fishing reel which will be simple in operation and which may be manufactured to retail at a popular price.

Other and incidental objects of the invention not specifically mentioned in the foregoing will be apparent as the description of the invention proceeds.

My invention is illustrated in the accompanying drawing, wherein:

Figure 1 is a vertical sectional view, partly in elevation, and showing the improved fishing reel as it would appear completely assembled.

Figure 2 is a vertical sectional view on the line 2—2 of Figure 1, looking in the direction indicated by the arrows.

Figure 3 is a vertical sectional view on the line 3—3 of Figure 1, looking in the direction indicated by the arrows.

Figure 4 is an enlarged fragmentary sectional view on the line 4—4 of Figure 3, showing the disc employed.

Referring now more particularly to the accompanying drawing, the numeral 1 indicates in general a reel frame which is provided with a relatively thick, preferably hard rubber end wall 2 adapted to carry the gearing necessary for communicating rotative movement imparted to the handle 3 mounted thereon, from said handle to a spool indicated in general by the numeral 4. The frame is provided at its opposite end with a circular end wall or cover 5 having a brake ring 6, preferably of hard rubber, extending throughout its circumference near the edge thereof, said brake ring to be described in full detail hereinafter. Connecting the end wall 2 with the end wall 5 and brake ring 6 are preferably metal tie rods 7, suitable screws 8 retaining the tie rods and end walls in proper relative position. A base web 9 also connects the end walls and said base web includes an integral mounting plate 10 which is adapted for positioning on a fishing rod.

As best seen in Figure 1 of the drawing, the spool 4 comprises a stem 11 having an opening 12 therein to receive the end of a fishing line, and said spool also includes a concavo convex end wall 13 which is adapted to extend throughout the chordal area of the inner face of the end wall 2. The spool also includes, at its opposite end, a concavo convex end wall 14, the edge of which terminates in close spaced relation to the inner edge of the brake ring 6. The spool is, of course, freely rotatable in the frame and said spool is provided axially of the wall 14 with a stem or stub shaft 15 which extends through the end wall 5 and is journaled by a bearing 16 having a protecting cap 17, of usual construction, thereon. Fixed on the stem 15, at its inner extremity and in close spaced relation to the wall 14, is a ratchet wheel 18.

Rotatably mounted on the stem 15 within the area of the brake ring 6 is a preferably metal disc 19 which is separated from the wheel or gear 18 by means of a washer 20. The disc is provided at its under side or bottom wall with a pawl bar 21 which is better seen in Figure 3 of the drawing. The pawl bar is pivotally connected to the disk and extends substantially chordally thereof. Said pawl bar is obtuse angular in formation and includes a pawl 22 at the inner side of the apex of said bar. As indicated by the numeral 23 and seen in Figure 4 of the drawing, the pawl bar is reduced in thickness near its free end and is provided with a stop lug 24 at its free end. Pivotally mounting the pawl bar is a screw 25 which extends through an enlarged head 26.

As seen in Figure 3, the pawl 22 is adapted removably to engage the ratchet wheel 18. Mounted on the disc 19 opposite the pivot 25, is a guide bar 27 which is cut away at it under side to define a recess 28 receiving the reduced portion 23 of the pawl bar. The guide bar is secured to the disc by means of rivets 29 and serves effectually to limit swinging movement of the pawl bar. Clamped in an enlarged head 30 of the guide bar and extending about the ratchet wheel 18 in spaced relation thereto and terminating in a kerf in the head 26 of the pawl bar, is a semi-circular leaf spring 31. The leaf spring serves to retain the pawl 22 normally in engagement with the ratchet wheel 18. The spring is of light construction, however, so that the pawl bar may be readily shifted against its tension. It will be seen that the pawl bar, pawl and ratchet wheel provide connection between the disc 19 and the spool 4.

Mounted on the top wall of the disc 19 are brake shoes which are indicated in general by the numeral 32. The brake shoes are substantially angular in shape and each comprises an outer arcuate engaging face 33, a flat end portion 34, and an angularly disposed arm 35 which terminates in a right angle ratchet wheel engaging tooth or pawl 36. The shoes are swingingly mounted on the disc by means of pins 37. Mounted on the end walls 34 and projecting from said walls substantially chordally of the disc 19, are leaf springs 38. The springs 38 terminate behind stop pins 39.

The end wall 5 has fixed thereto a ratchet wheel 40 which is adapted for engagement by the pawls 36 of the brake shoes 32. As will be observed, the pawls on the shoes 32 normally cooperate with the ratchet wheel 40 for permitting a clicking connection between the disc and the end wall 5. That is to say, as the pawls 36 will engage the teeth of the ratchet wheel 40 as the disc rotates, a slight retarding of the disc will, of course, take place.

The operation of the device is as follows:

When the spool is wound with a fishing line and it is desired to cast said line, with the hook, bait or lure, it is only necessary to cast the line in the usual manner. The spool will, of course, rotate as the line pays out and the disc will rotate with the spool. Should the spool rotate faster than the line pays out properly, the shoes 32 will be swung outwardly by centrifugal force on the pins 37 against the tension of the spring 38, into engagement with the brake ring 6 so that a braking action will be exerted on the disc and the same slowed down. The slower rotative motion of the disc will be intermittently communicated to the spool through the pawl 22 and ratchet wheel 18 so that said disc will tend to slow down the spool to such a speed that the line will be paid out evenly and without danger of tangling or snarling.

While I have shown in my present embodiment of the invention, a device employing two of the brake shoes 32, it should be understood that, if desired, but one shoe may be employed. Under certain circumstances, it is quite possible that a device employing but one shoe will give better results than the present embodiment. However, this will depend to a considerable extent upon the weight of the shoes and how they are made.

It is desired to call attention to the fact that when the reel is not in action, the pawl points 36 engage the ratchet wheel 40 and give a result exactly the same as that produced by the drag in an ordinary fishing reel. Moreover, when the line is cast and the spool revolves, the brake shoes are shifted by centrifugal action and release the pawls 36 from the wheel so that there is absolutely no retarding action by the brakes when casting, unless, as stated, the spool and disc revolve fast enought to engage the brake shoes with the brake ring. Attention is further directed to the fact that, inasmuch as I employ two ratchet wheels, a fishing reel of great flexibility will be provided. The fact that independent rotative movement is provided for the spool with respect to the disc and for the disc with respect to the end wall and the spool, full freedom for the spool will be gained when the line is being cast. This is a particularly valuable feature of the present reel as the inexperienced fisherman will not be required to place his thumb on the spool either at the beginning or ending of the casting operation. He may grasp the rod handle far back of the reel, as he would grasp a tennis racket, and throw the lure to the desired location without touching the spool. The line will run out and stop without backlash, in view of the normally rigid connection between the spool, disc and end wall, as set forth. It is believed that I have provided a simple and highly efficient fishing reel which will permit greater pleasure to be had from fishing.

Having thus described the invention, what I claim is:

1. A fishing reel including a frame, a spool rotatable therein and having a stem, a ratchet wheel fixed on the stem, a disc rotatable on the stem adjacent the ratchet wheel, a pawl bar carried at one side of the disc and having a pawl engageable with the ratchet wheel, a guide bar carried by the disc, a spring connecting the guide bar with the pawl bar and normally retaining the pawl in engagement with the ratchet wheel, a brake ring carried by the frame, a cover carried by the frame and overlying the brake ring, and brake shoes carried on the disc opposite the pawl bar and being radially shiftable into engagement with the brake ring as the spool is rotated for retarding the speed of the disc and communicating the retarded movement to the spool through the first mentioned ratchet wheel and the pawl at too great rotative speed of the spool.

2. A fishing reel including a frame, a spool rotatably mounted in the frame, a cover, means on the frame for rotating the spool, a ratchet wheel carried on one end of the spool, a disc rotatably mounted in the frame, a pawl bar carried at one side of the disc and having a pawl engageable with the ratchet wheel, one end of said pawl bar being reduced, a guide bar carried by the disc and having a cut away portion to accommodate the reduced portion of the pawl bar, said guide bar limiting shifting movement of said pawl bar, a spring connecting the guide bar with the pawl bar and retaining the pawl in engagement with the ratchet wheel, and means carried by the cover and adapted for imparting a retarding clicking action to the disc and spool during an unreeling operation whereby backlash will be prevented.

3. A fishing reel including a frame, a spool rotatable therein, means for rotating the spool, a disc mounted on the spool at one end thereof and adapted to rotate therewith, means for connecting the disc with the spool, a cover closing one end of the frame, a ratchet wheel secured to the cover, a brake ring carried by the frame beneath the cover, and a brake shoe carried by the disc and having a pawl normally engageable with the ratchet wheel, said shoe being engageable with the brake ring as the spool and disc are rotating at a high rate of speed for retarding the speed of the disc and spool and preventing tangling of a line unwinding from said spool.

4. In a fishing reel, a frame, a spool rotatable therein and having a stem, a ratchet wheel carried on the stem, a disc rotatable on the stem, a pawl bar carried by the disc and having a pawl engageable with the ratchet wheel, a guide bar on the disc, a spring connecting the guide bar with the pawl bar and normally retaining the pawl in engagement with the ratchet wheel whereby said disc and spool will be caused to rotate as a unit, a cover on the frame, a ratchet wheel on the cover, and means on the disc and engageable with the last mentioned ratchet wheel for normally providing a clicking sound during normal rotation of the disc and spool, said means including brake shoes engageable with the cover at too great rotation of the disc and spool for slowing down said disc and spool.

5. In a fishing reel, a frame, a spool rotatable therein, a ratchet wheel carried by the spool, a disc rotatable on the spool adjacent the ratchet wheel and having a pawl for connecting the disc and the spool, a cover on the frame, and means on the disc and engageable with the cover at too fast rotation of the disc and spool for retarding rotation of the disc and spool.

6. In a fishing reel, a frame having a brake ring, a spool rotatable in the frame and having a ratchet wheeel, a disc on the spool, means on the disc and engageable with the ratchet wheel for connecting the disc and spool, a brake shoe shiftably mounted on the disc, and a cover overlying the brake ring and disc, said brake shoe being adapted to shift into engagement with the brake ring at too great rotative speed of the spool for retarding the disc, said ratchet wheel and means being adapted to retard rotation of the spool.

WILLIAM F. WATSON.